June 20, 1961 K. A. DUKE 2,989,237

CODED DECIMAL ADDER SUBTRACTOR

Filed May 13, 1957 3 Sheets-Sheet 1

INVENTOR
KEITH ALBERT DUKE

BY Kane and Nydick

ATTORNEYS

INVENTOR
KEITH ALBERT DUKE
BY Hane and Nydick
ATTORNEYS

INVENTOR
KEITH ALBERT DUKE
BY Hane and Nydick
ATTORNEYS 2,989,237
Patented June 20, 1961

2,989,237

CODED DECIMAL ADDER SUBTRACTOR

Keith Albert Duke, Stevenage, England, assignor to International Computers and Tabulators Limited, London, England, a British company Filed May 13, 1957, Ser. No. 658,876
Claims priority, application Great Britain May 14, 1956
4 Claims. (Cl. 235—169)

This invention relates to digital calculating apparatus. It is the object of the present invention to provide an adding and/or subtracting circuit capable of operating in any selected scale of notation.

The invention will now be described, by way of example, with reference to the accompanying drawings in which.

Figure 1:
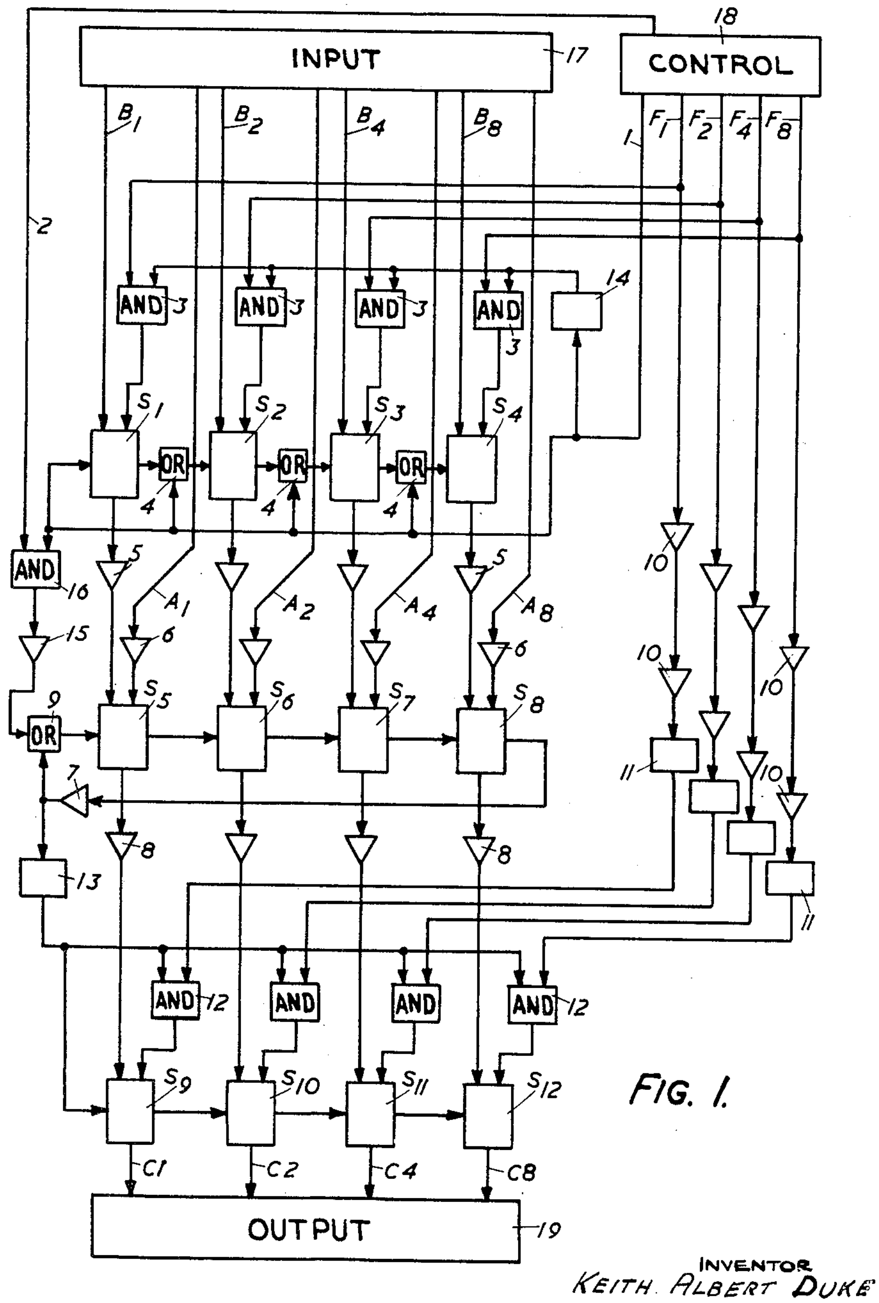
FIGURE 1 is a block schematic diagram of an adding and subtracting circuit.

An adding circuit according to the invention comprises digital calculating apparatus for operating on signal groups, each group of simultaneously occurring signals representing a binary coded input digit, including a first circuit adapted to form a first sum signal group from signal groups representing a first input digit and a filler digit, a second circuit adapted to form a second sum signal group and a carry signal from signal groups representing the first sum and a second input digit, and a third circuit adapted to form a third sum signal group representing either the second sum or the second sum less the filler digit, in dependence on the occurrence or non-occurrence respectively, of said carry signal.

A subtracting circuit according to the invention comprises digital calculating apparatus for operating on signal groups, each group of simultaneously occurring signals representing a binary coded input digit, including a first circuit adapted to form a first difference signal group representing the binary complement of a first input digit, a second circuit adapted to form a second difference signal group and a carry signal from signal groups representing the first difference and a second input digit, and a third circuit adapted to form a third difference signal group representing either the second difference or the second difference less the filler digit in dependence on the occurrence or non-occurrence, respectively, of said carry signal.

An adding or subtracting circuit according to the invention comprises digital calculating apparatus for operating on successively occurring pairs of first and second groups, each group representing a binary coded input digit, including a source of filler digit signals, means adapted to apply the first signal groups to a first circuit, means adapted to apply the filler digit signals selectively to the first circuit, means for deriving a first result signal from the first circuit and applying such signal to a second circuit with a delay of one digit interval on the corresponding input signal, means for applying the second signal groups to the second circuit with a delay of one digit interval, means for deriving a second result signal from the second circuit and applying such signal to a third circuit with a delay of one digit interval on the corresponding first result signal, means for selectively applying filler digit signals to the third circuit and means adapted to derive a third result signal from the third circuit.

The adding circuit operates in a binary coded notation in which each digit of a decimal number is represented by its binary equivalent in a scale of sixteen. When two such binary coded digits are added, the rules of pure binary addition apply if the sum does not exceed nine. If the sum exceeds nine, a carry must be propagated into the next digit position. This can be effected by adding six to the result, which produces a carry and also leaves a sum which has the correct decimal value for the particular denomination operated upon. For example, to form the sum 7+8=15 the operation would be:

$$0111+1000+(0110)=1,0101$$

the value in brackets is the added six and the 1 in the most significant denomination of the result represents a decimal carry.

The additional digit will be referred to as a filler digit, and numerically it is equal to the difference between the natural radix of the adding circuit and the radix required. In the case of the decimal scale the filler digit is six (16–10), and in the scale of twelve it is four (16–12). Thus, by choice of the correct filler digit for each denomination, the adding circuit can be made to operate in mixed notations such as sterling.

Pulses representing the code components of the two digits to be added are presented simultaneously and successive denominations of the two numbers are presented serially, commencing with the least significant, the interval between successive denominations being $t$.

Addition is effected in three steps:

Step 1.—The code components of the filler digit are added to the corresponding binary components of the augend to form a sum output;

Step 2.—The addend is added to this sum output to form sum and carry outputs.

Step 3.—If the carry output is zero, the filler digit is subtracted from the sum.

The output from steps 1 and 2 are reshaped and retimed, an operation which results in a delay of $t$ between the commencement of steps 1 and 2, and again between the commencement of steps 2 and 3. The final output from step 3 occurs therefore an interval $2t$ after the presentation of the corresponding denomination of the addend and augent.

In FIGURE 1, pulses representing the code components of the addend are applied over lines A1, A2, A4 and A8, from a data source 17, and those of the augend over lines B1, B2, B4 and B8, the suffix denoting the value of the binary component. The components of the requisite filler digit are applied from a control unit 18 via lines F1, F2, F4 and F8 simultaneously with the inputs on lines A and B.

Step 1 is effected by means of four adders, S1–S4, each of which has three inputs. One input is that provided by the lines B1–B8 and another is that provided by the lines F1–F8, via gates 3 which are open during addition. The third input to the adder S1 is derived from the control unit 18 over a line 1. This input is zero during addition. The third input to the adders S2, S3 and S4 is derived from gates 4 which are those known as logical "OR" circuits, that is, they give an output when either one or both of the two possible inputs are present. One input to the gates is provided by the carry from the preceding adder S1, S2 or S3, and the other input by line 1. Since the input from this line is zero during addition, a carry can be propagated from one adder to the next. The sum of an augend digit and a filler digit cannot exceed fifteen, so that no carry output can be produced by the adder S4.

Reshaping and retiming of the outputs from the adders are effected by delay circuits 5. The outputs from these circuits have the correct waveform to operate the next set of adders and the timing of the output is such that it coincides with the next digit period.

The output of the delay circuits 5 is combined with the code components of the addend in four adders S5–S8 to effect step 2 of the addition. As the outputs from the delay circuits 5 occur one digit time ($t$) later than the corresponding inputs on the lines A and B, similar delay circuits 6 are inserted between the lines A and the adders S5–S8.

Carriers from the adders S5, S6 and S7 are entered directly into the adder of the next higher binary component.

A carry from the adder S8 represents the decimal value ten and must be entered as a "1" in the next decimal denomination, one digit time later. It is accordingly delayed by a delay circuit 7 and then entered into the adder S5 via a gate 9 one digit time later. The gate 9 is a logical "OR" circuit, the other input to which is zero during addition.

The sum outputs from the adders S5–S8 are reshaped and retimed in delay circuits 8 and fed to four adders S9–S12 to effect step 3 of the addition.

If there has been a carry from S8, the sum outputs are correct and no operation takes place on this step, but if no carry has occurred, the filler digit which was added in step 1 must be subtracted from the sum output to obtain the correct result. This subtraction is effected by adding the complement with respect to 16 of the filler digit. It is a property of a binary number that its complement can be obtained by the inversion of each digit. With a binary coded digit, this produces a complement with respect to 15, which can be converted to a complement with respect to 16 by the addition of one.

The filler digit components are presented on the lines F1–F8 simultaneously with the input on the lines A and B, but as the output from the delay circuits 8 occurs $2t$ after the input on lines A and B, the input on each line F is delayed for $2t$ by two delay circuits 10, in series. The output of the second of these is inverted by a group of four inverters 11 and applied to AND gates 12. The other input to the gates is provided from the carry output of the adder S8, via the delay 7 and an inverter 13. If there has been no carry from the adder S8, the inverter gives an output to open the gates 12. The output from the gates will therefore correspond to the complement, with respect to 15, of the filler digit. This is fed to the adders S9–S12 and added to the output from the delays 8 to produce a sum output on lines C1, C2, C4 and C8, leading to an output utilisation circuit 19. Carries are propagated from the adders S9, S10 and S11 to the adders S10, S11 and S12 respectively.

As explained above, it is necessary to add a one to obtain a correct complement with respect to 16. This is effected by feeding the output from the inverter 13 to the adder S9. If, however, the carry output from the adder S8 represents "1" no output is obtained from the inverter 13 and no subtraction of the filler digit takes place. The pulse trains on the lines C1, C2, C4 and C8 thus represent the code components of the sum delayed by $2t$ with respect to the corresponding denominations of the addend and augend.

Subtraction is effected by converting the subtrahend digits on the lines B1 to B8 to complementary form and adding them to the digits on the lines A1 to A8. The addition of the filler digits in the adders S1 to S4 is suppressed, but the filler digits are subtracted, by the addition of complements, in the adders S9 to S12, if no carry is produced by the adder S8.

There are thus three steps in a subtraction, namely:

Step 1.—The complement to 15 of B is formed in the adders S1 to S4.

Step 2.—The complement of B is added to A in the adders S5 to S8.

Step 3.—If the adder S8 has not produced a carry, the complement to 16 of the filler digits is added to the sum output from step 2 in adders S9 to S12. If adder S8 produces a carry, no operation takes place in step 3.

In effecting the operation $A-B$ there are three possibilities, that $A=B$, that $A>B$ or that $A<B$.

In the first two cases $(A>B)$

Step 1 forms $(15-B)$

Step 2 forms $A+(15-B)$ or $(A-B)+15$

Since $A-B$ is either zero or a positive integer, the addition of a carry from the previous denomination (or the addition of the so-called "elusive one" if it is the lowest denomination), will cause a carry from adder S8, so that step 3 is omitted and the correct result $(A-B)$, appears on lines C. If $A<B$, then step 1 forms $(15-B)$ as before but step 2 forms $(A-10)+(15-B)$ or $(A-B)+5$. Since $(A-B)$ cannot exceed 9, no carry can be produced by the adder S8 and step 3 forms $(A-B+5)+(16-F)$ where F is the filler digit. In the case of the decimal scale, F is equal to six so that the expression $(A-B+5)+(16-F)$ *becomes* $(A-B)+15$ as in the case considered previously. From this it will be appreciated that the subtraction steps set out above provide the correct results and are very similar to the addition steps previously described.

The potential of line 1 is operative during subtraction, so there is no output from the inverter 14. Gates 3 are therefore closed and prevent the entry of the filler digits into the adders S1 to S4. Line 1 also provides an input to the gates 4 and to the third input of adder S1. This has the effect of entering one into each of the adders S1 to S4 and each adder, therefore, produces the inverse of the corresponding binary component of B.

Step 2 of the subtraction corresponds exactly to step 2 of the addition operation except that during the addition of the least significant pair of digits, "1" is entered into the adder S5 through the gate 9. A line 2 from the control unit 18 carries a pulse only when the least significant digits are present on the A and B input lines. This pulse is applied to a gate 16 which is opened during subtraction by the control voltage on line 1. The output of gate 16 is fed, via a delay and re-shaping circuit 15 to the input of the gate 9. Any carry from the adder S8 is entered into the adder S5 via the gate 9 after a digit delay imposed by the delay element 7.

The subtraction of the filler digit in the adders S9 to S12 is controlled by thec arry from S8 in the same manner as for step 3 of an addition operation.

It will be appreciated that, by using a different filler digit, other scales of notation of the input digits, may be accommodated. For example the filler digit is not necessarily constant during an addition, or subtraction, so that mixed scales of notation, such as sterling currency or weights, may be dealt with. Furthermore, more than four binary components may be used to represent a digit, with a corresponding increase in the number of adders in each group. For example a five component code allows the representation of digits in the scale of 28.

In the arrangement described above, the only carries between successive digits which occur are generated by the adder S8, and these carries are fed back to the adder S5, after a digit delay. Consequently, there is no carry propagation from one group of adders to any other group. This permits the insertion of pulse delay and reshaping elements between each group of adders, which ensures that each adder is operated by pulses of the correct timing and shape. This becomes of increasing importance as the digit repetition rate is raised, since the distortion of a pulse in passing through one adder may be such that it is difficult to ensure that the distorted pulse will produce reliable operation of a further adder.

Figure 2:
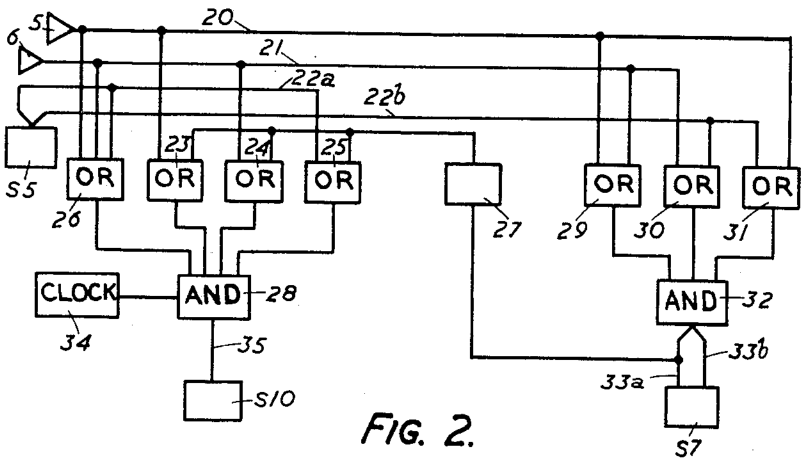
FIGURE 2 is a block schematic diagram of an adder.

The operation of the adders S will now be described with reference to a schematic diagram of the adder S6 (FIGURE 2). The outputs from delays 5 and 6 are applied on lines 20 and 21 to two "OR" gates 23 and 24 respectively. The carry output from S5 is applied over two lines 22a and 22b, the line 22a feeding another "OR" gate 25. The three lines 20, 21 and 22a provide an input to a three-input "OR" gate 26. The other input to the gates 23, 24 and 25 is provided from an inverter 27 which gives an output only when either none or one of the three possible inputs on lines 20, 21 and 22b are present. The output of the "OR" gates is fed to an "AND" gate 28, the output of which on a line 35 represents the sum output of the adder.

If there is no input to the adder on lines 20, 21 or 22, the gates 23, 24 and 25 give an output by virtue of the operation of inverter 27. The gate 26 is not, however, operated and three only of the four necessary inputs to the gate 28 are present and so there is no sum output. When one of the lines 20, 21 or 22 is energised, gate 26 gives an output also and the sum output on line 35 represents "1."

When two of the input lines are energised, there is no output from the inverter 27 and three only of the four "OR" gates will be operated, resulting in no sum output. When all the input lines are energised, all four "OR" gates are operated and a "1" sum output is obtained.

To form a carry when either two or three inputs to the adder are present, three two-input "OR" gates 29, 30 and 31 are provided which are each fed from a different pair of input lines 20, 21 and 22*b*. Although the input on the line 22*b* is the same as that on 22*a*, it is convenient to provide separate outputs from the adder S5 to feed the sum and carry circuits as will be explained later.

The output from gates 29, 30 and 31 operates an "AND" gate 32, the output of which on lines 33*a* and 33*b* represent the carry output of the adder. The line 33*a* feeds the inverter 27.

When either none or one of the inputs are present, at least one of the gates 29, 30 or 31 fails to give an output, so that the carry output on lines 33 is zero. When either two or three inputs are present, all three "OR" gates produce an output to operate the gate 32, producing a carry output representing "1."

Although the re-shaping and re-timing of the adder output has been described above as being affected by separate delay circuits 5 and 8, it is convenient to incorporate these functions in the adder. Accordingly the "AND" gate 28 is provided with a fifth input derived from a clock pulse generator 34, so that the output from the gate is coincident with a clock pulse.

Figure 3:
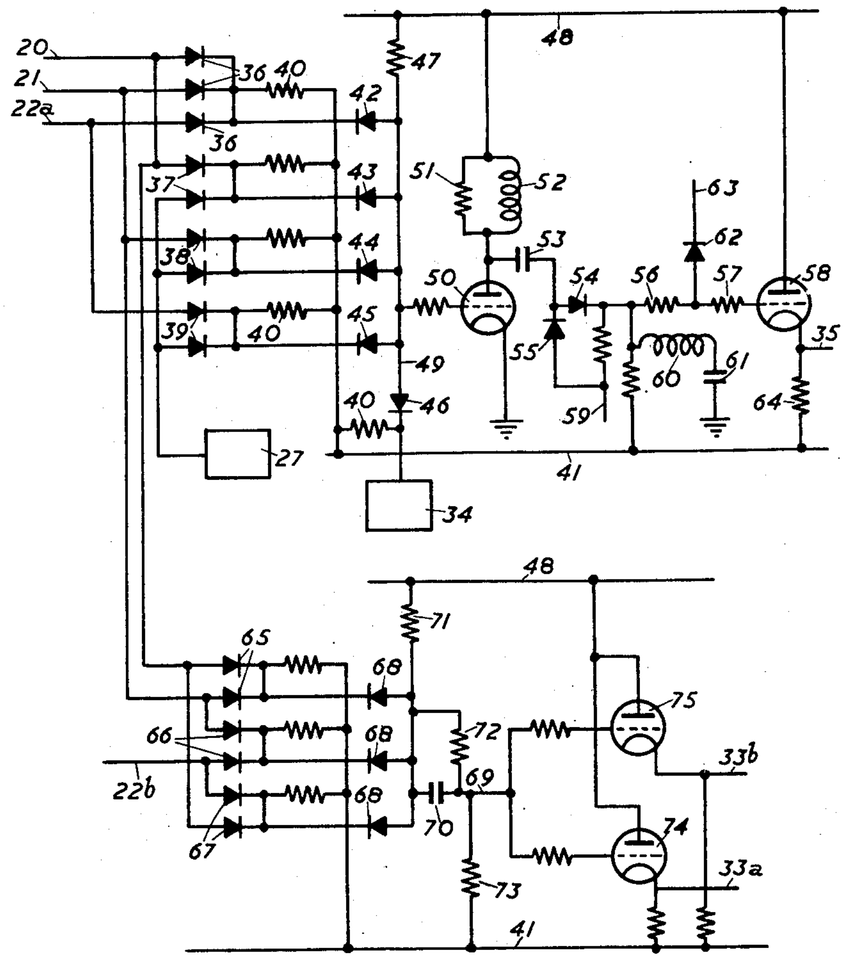
FIGURE 3 is a circuit diagram of an adder.

The "OR" gates 26, 23, 24 and 25 comprise groups of diodes 36, 37, 38 and 39 respectively (FIGURE 3). Since it is the convention of the circuit that a "1" is represented by a positive voltage or pulse, the input lines are connected to the anodes of the diodes. The cathodes of the diodes 36 are connected to the cathode of a diode 42 and also, via a resistor 40, to a negative bias line 41. The cathodes of diodes 37, 38 and 39 are similarly connected to the cathodes of 43, 44 and 45 respectively, and also through resistors to the line 41. The anodes of diodes 42 to 45 are connected to a line 49 which receives a potential from a positive supply line 48 through a resistor 47. The clock pulse generator 34 is connected to the line 49 through a diode 46 and to the line 41 through a resistor corresponding to the resistors 40.

Diodes 42 to 46 inclusive comprise the "AND" gate 28 (FIGURE 2). Normally line 49 is maintained at a low potential by virtue of the potential divider formed between the lines 48 and 41 by resistors 47 and 40 through one or more of the diodes 42 to 46. When, however, there is a positive output from all the "OR" gates and from the clock pulse generator 34, the diodes cease to conduct and the potential of line 49 rises. A triode valve 50 is controlled by the potential of line 49 in such a way that the valve is normally cut off, but conducts heavily when the potential of line 49 rises. Valve 50 with its associated components forms a pulse re-shaping circuit. A resistor 51 is parallel with an inductor 52 in the anode circuit of the valve forms a ringing circuit and the resulting pulse on the anode of the valve is fed via a capacitor 53 to a diode 54 which passes the positive part of the pulse to the grid of an output valve 58 via two resistors 56 and 57 in series. The negative excursion of the pulse from the anode of valve 50 is limited by a diode 55, the anode of which is connected to a negative bias line 59. The output of the diode 54 is further shaped by an inductor 60 in series with a capacitor 61, the other side of which is earthed.

The positive excursion of the pulse on the grid of valve 58 is limited by means of a diode 62. The anode of diode 62 is connected to the junction of the resistors 56 and 57 and the cathode of the diode is connected to a positive bias line 63. Valve 58 is connected as a cathode follower and the output is taken via the line 35 from the cathode load resistor 64.

The "OR" gates 29, 30 and 31 (FIGURE 2) associated with the carry circuit are composed of three pairs of diodes 65, 66 and 67 respectively, the outputs of which are fed to diodes 68 forming the "AND" gate 32. The operation of these gating diodes is similar to that of the corresponding gating diodes of the sum circuit just described. The output from the "AND" gate diodes 68 is fed via a capacitor 70 to a line 69, the potential of which is normally stabilised by the potential divider formed by resistors 71, 72 and 73 in that order between the lines 48 and 41. When the "AND" gate is operated, the potential of line 69 rises and this output is fed to the following stage via cathode followers. It is possible to use a single cathode follower valve to feed both the sum and carry "OR" gates of the following stage, but to ensure that a carry is propagated through successive stages with the minimum of distortion, it is preferred to feed the output through two separate valves. Accordingly the output on line 69 is split between two cathode followers, valves 74 and 75. Valve 74 feeds line 33*a* and 75 feeds line 33*b*.

The other adders are similar to S6 except for obvious differences in input and output arrangements. Delay and re-shaping circuits not associated with an adder output, such as those referenced 10 and 15 in FIGURE 1 utilise the part of the circuit just described associated with valve 50. It is fed by a two-diode "AND" gate, one input from the input line and the other from the clock pulse generator 34. The other "AND" and "OR" gates shown in FIGURE 1 are diode gates similar to those shown in the input circuit of FIGURE 3.

Figure 4:
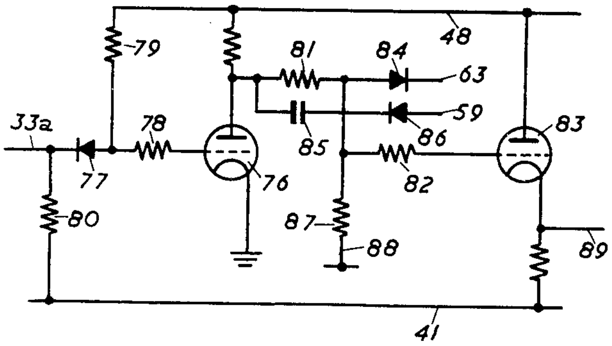
FIGURE 4 is a circuit diagram of an inverter.

The inverter 27 comprises a triode valve 76 (FIGURE 4), the grid potential of which is controlled by the line 33*a* via a diode 77 and a series resistor 78. In the absence of an input on line 33*a*, the grid potential is kept below the cathode potential by means of a potential divider former by resistors 79 and 80. Resistor 79 is connected between line 48 and the anode of diode 77 and resistor 80 between the cathode of diode 77 and the negative line 41. The valve is normally cut off and the anode voltage is high. A positive pulse on line 33*a* prevents conduction through diode 77 which results in a rise of grid potential in valve 76 and the valve conducts. The negative pulse on the anode of the valve is fed via resistors 81 and 82 in series to a cathode follower valve 83, the output of which, on a line 89 is the image of the pulses on line 33*a*.

The junction of resistors 81 and 82 is connected via a diode 84 to the positive bias line 63 and also via a resistor 87 to a negative bias line 88. These connections to the two bias lines serve to stabilise the normal grid voltage of the cathode follower. The amplitude of the negative pulse on the anode of valve 76 is controlled by a capacitor 85 connected via a diode 86 to the negative bias line 59.

The inverters 14, 13 and 11 (FIGURE 1) are similar.

I claim:

1. Electronic apparatus for summing two digits each entered as a simultaneously occurring group of electrical signals representing a digital value according to a binary code, each code component being represented by an electrical signal on a separate line, comprising a first group of entry lines over which may be received signals representing one of the entered digits, a second group of entry lines over which may be received signals representing the other of the entered digits, a third group of entry lines to which may be applied electrical signals according to the said binary code and representing a filler digit, a first group of summing devices controlled jointly by signals on the first and third groups of entry lines to produce sum representing electrical signals according to the said binary code on a first group of output lines, which signals represent the sum of said one of the entered digits and said filler digit, a second group of summing devices controlled jointly by signals on the second group of entry lines and the first group of output lines for producing outputs representing respectively sum and carry values, the carry value being represented by a single electrical signal on a carry output line and the sum value which is the sum of both of said entered digits and said filler digit, being represented according to said binary code by electrical signals on a second group of output lines, means for generating signals representing a negative value corresponding to the filler digit and expressed according to the said binary code, means for inhibiting the signals representing said negative value in response to the occurrence of a signal on the said carry output line from said second group of summing devices, a third group of summing devices controlled jointly by the signals representing the said negative value and the signals on the second group of output lines for producing a final corrected sum value represented by electrical signals on a third group of output lines according to the said binary code, such that said negative value is subtracted from the sum represented by the signals on said second group of outlet lines if there is no carry output from said second group of summing devices, and means for applying the carry signal delayed in time to a carry input of the second group of summing devices, whereby the final sum value is corrected according to the absence or presence of only a single carry signal.

2. Electronic apparatus for summing two entered digits comprising a first group of four lines over which may be received simultaneously electrical signals representing one of the entered digits in a four-component binary code, a second group of four lines over which may be received simultaneously electrical signals representing the other of the entered digits in the four-component binary code, a third group of four lines to which may be applied simultaneously electrical signals representing a filler digit in the four-component binary code, separate ones of the lines in each of the groups each carrying a signal representing one of the binary code components, a first group of summing devices for forming the sum of two input values, as a single value represented in the four-component binary code and having two groups of four input lines and a group of four output lines, the two groups of input lines being connected to the group of lines over which may be received signals representing the said one entered digit and to the group of lines over which may be received signals representing the filler digit respectively, a second group of summing devices for forming the sum of two input values as a carry signal and a value represented in the four-component binary code and having two groups of four input lines, a carry input line, a group of four output lines and a carry output line, the two groups of input lines of the second group of summing devices being respectively connected to the group of output lines of the first group of summing devices and to the group of lines carrying signals representing the said other of the entered digits, while said group of output lines can carry signals representing in said binary code the sum of both of said entered digits and said filler digit, a third group of summing devices for forming the sum of two input values, as a single value represented in the four-component binary code and having two groups of four input lines and a group of four output lines, one group of input lines of the third group of summing devices being connected to the group of output lines of the second group of summing devices, means for applying signals representing a negative value corresponding to the filler digit value according to the four-component binary code to the other group of input lines of the third group of summing devices if there is no carry signal on the carry output line of the second group of summing devices, and delay means connecting the carry output line to the carry input line whereby a sum value represented by signals on the output lines of the second group of summing devices is corrected by the subtraction of a previously added filler digit value only in dependence upon the non-occurrence of a single carry signals.

3. Electronic apparatus for the algebraic sum of two entered digits comprising a first group of four lines over which may be received simultaneously electrical signals representing one of the entered digits in a four-component binary code, a second group of four lines over which may be received simultaneously electrical signals representing the other of the entered digits in the four-component binary code, separate ones of the lines in each of the groups each carrying a signal representing one of the binary code components, a first group of summing devices for forming a first difference value equal to the binary complement of the said one of the entered digits, the first difference value being represented in the four-component binary code, the group of summing devices having a group of four input lines and a group of four output lines, and each summing device having a separate carry input line, the group of input lines being connected to the group of lines carrying signals representing the said one entered digit, the said separate carry input lines each being connected to a line carrying a signal representing a binary one, the said first difference value being represented by signals on the group of output lines, a second group of summing devices for forming a second difference value representing the algebraic sum of two input values as a carry signal and a value represented in the four-component binary code and having two groups of four input lines, a carry input line, a group of four output lines and a carry output line, the two groups of input lines of the second group of summing devices being respectively connected to the group of output lines of the first group of summing devices and to the group of lines carrying signals representing the said other of the entered digits, a third group of summing devices for forming a third difference value representing the algebraic sum of two input values, the said third difference value being represented in the four-component binary code, and having two groups of four input lines and a group of four output lines, one group of input lines of the third group of summing devices being connected to the group of output lines of the second group of summing devices, means for applying signals representing a negative value corresponding to the filler digit value according to the binary code to the other group of input lines of the third group of summing devices if there is no carry signal on the carry output line of the second group of summing devices, and delay means connecting the carry output line to the carry input line, whereby the difference value represented by signals on the output lines of the second group of summing devices is corrected by the subtraction of a filler digit value only in dependence upon the non-occurrence of a single carry signal.

4. Electronic apparatus for forming the algebraic sum of two entered digits comprising a first group of four lines over which may be received simultaneously electrical signals representing one of the entered digits in a four-component binary code, a second group of four lines over which may be received simultaneously electrical signals representing the other of the entered digits in the four-component binary code, a third group of four lines to which may be applied simultaneously electrical signals representing a filler digit in the four-component binary code, separate ones of the lines in each of the groups each carrying a signal representing one of the binary code components, control means having control lines, the control means generating control signals on the control lines in dependence upon whether the algebraic sum of the entered digits is required to be effectively formed additively or subtractively, a first group of summing devices for forming the sum of two input values as a single value represented in the four-component binary code, the group of summing devices having two groups of four input lines and a group of four output lines, and each summing device having a separate carry input line, one group of input lines of the first group of summing devices being connected to the group of lines carrying signals representing the said one entered digit, means controlled by a signal on a control line for connecting the other group of input lines of the first group of summing devices to the group of lines carrying signals representing the filler digit only if the sum is required to be effectively formed additively and connecting only the separate carry input of each of the summing devices of the first group to a line carrying a signal representing a binary one if the sum is required to be effectively formed subtractively, a second group of summing devices for forming the sum of two input values a carry signal and a value represented in the four-component binary code and having two groups of four input lines, a carry input line, a group of four output lines, and a carry output line, the two groups of input lines of the second group of summing devices being respectively connected to the group of output lines of the first group of summing devices and to the group of lines carrying signals representing the said other of the entered digits, a third group of summing devices for forming the sum of two input values as a single value represented in the four-component binary code and having two groups of four input lines and a group of four output lines, one group of input lines of the third group of summing devices being connected to the group of output lines of the second group of summing devices, means for applying signals representing a negative value equal in magnitude to the filler digit value according to the binary code to the other group of input lines of the third group of summing devices in response only to the non-occurrence of a carry signal on the carry output line of the second group of summing devices, and delay means connecting the carry output line to the carry input line, whereby the algebraic sum value represented by signals on the output lines of the second group of summing devices is corrected by the subtraction of a filler digit value only in dependence upon the non-occurrence of a single carry signal.

References Cited in the file of this patent

UNITED STATES PATENTS

| | | |
|---|---|---|
| 2,364,540 | Luhn | Dec. 5, 1944 |
| 2,623,115 | Woods-Hill et al. | Dec. 23, 1952 |
| 2,890,830 | Woods-Hill | June 16, 1959 |

FOREIGN PATENTS

| | | |
|---|---|---|
| 678,427 | Great Britain | Sept. 3, 1952 |
| 685,441 | Great Britain | Jan. 7, 1953 |

OTHER REFERENCES

Townsend: Serial Digital Adders for a Variable Radix of Notation, Electronic Engineering, October 1953 (pages 410–416).